United States Patent
Ham et al.

(10) Patent No.: US 9,879,641 B2
(45) Date of Patent: Jan. 30, 2018

(54) HEATER CONTROL APPARATUS AND HEATER CONTROL METHOD OF FUEL FILTER FOR VEHICLE

(71) Applicants: HYUNDAI MOTOR COMPANY, Seoul (KR); KIA MOTORS CORPORATION, Seoul (KR)

(72) Inventors: Chang Ho Ham, Ansan-si (KR); Dong Myoung Ryoo, Yongin-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 67 days.

(21) Appl. No.: 14/960,060

(22) Filed: Dec. 4, 2015

(65) Prior Publication Data

US 2017/0058843 A1 Mar. 2, 2017

(30) Foreign Application Priority Data

Aug. 25, 2015 (KR) .................. 10-2015-0119463

(51) Int. Cl.
*F02M 31/125* (2006.01)
*F02D 41/22* (2006.01)
*F02D 41/20* (2006.01)

(52) U.S. Cl.
CPC .......... *F02M 31/125* (2013.01); *F02D 41/22* (2013.01); *F02D 41/221* (2013.01); *F02D 41/222* (2013.01); *F02D 2041/2093* (2013.01); *F02D 2041/224* (2013.01); *F02D 2200/021* (2013.01); *F02D 2200/023* (2013.01); *F02D 2200/0606* (2013.01); *F02D 2200/0608* (2013.01); *F02D 2200/503* (2013.01); *Y02T 10/126* (2013.01); *Y02T 10/40* (2013.01)

(58) Field of Classification Search
CPC ................. F02M 31/125; F02D 41/22; F02D 2200/0606; F02D 2041/224; F02D 41/221; F02D 41/222
See application file for complete search history.

(56) References Cited

U.S. PATENT DOCUMENTS

| 4,539,108 | A | * | 9/1985 | Izutani | ................ | B01D 35/18 |
|  |  |  |  |  |  | 123/557 |
| 6,260,545 | B1 | * | 7/2001 | Suzuki | ................ | F02B 33/443 |
|  |  |  |  |  |  | 123/550 |
| 9,222,699 | B1 | * | 12/2015 | Hendrickson | ........ | F02M 37/223 |

FOREIGN PATENT DOCUMENTS

| JP | 2008-303867 A | 12/2008 |
| JP | 2014-051920 A | 3/2014 |
| KR | 10-2004-0002253 A | 1/2004 |
| KR | 10-2012-0060102 A | 6/2012 |
| KR | 10-2012-0136943 A | 12/2012 |
| KR | 10-2013-0060629 A | 6/2013 |
| KR | 10-1510008 B1 | 4/2015 |

* cited by examiner

*Primary Examiner* — Jacob Amick
(74) *Attorney, Agent, or Firm* — McDermott Will & Emery LLP

(57) ABSTRACT

A heater control apparatus of a fuel filter for a vehicle includes a heater mounted within a fuel filter; a relay for a heater power source supplying or interrupting power of a battery to or from the heater; a fuel temperature detection sensor mounted on an engine and detecting a temperature of a fuel; and an engine electronic control unit (ECU) for switching on and off the relay based on a detection signal of the fuel temperature detection sensor.

5 Claims, 3 Drawing Sheets

ID_APPARATUS AND
HEATER CONTROL APPARATUS AND HEATER CONTROL METHOD OF FUEL FILTER FOR VEHICLE

CROSS-REFERENCE TO RELATED APPLICATION

This application claims under 35 U.S.C. §119(a) the benefit of priority to Korean Patent Application No. 10-2015-0119463 filed on Aug. 25, 2015, which is incorporated by reference herein in its entirety.

TECHNICAL FIELD

The present disclosure relates to a heater control apparatus and a heater control method of a fuel filter for a vehicle. More particularly, the present disclosure relates to a heater control apparatus and a heater control method of a fuel filter for a vehicle, capable of improving a switching-on/off control of a relay for a heater power source for operating a heater of a diesel fuel filter.

BACKGROUND

Referring to FIG. 1, a fuel supply system for a diesel vehicle includes a fuel filter 20 for filtering a fuel in a fuel tank 10 to supply the filtered fuel to an engine. A thermo-switch 22 for detecting a temperature of the fuel, a heater 24 that is switched on and off according to the detected temperature of the fuel, a moisture sensor 26 for detecting whether the amount of moisture filtered from the fuel is larger than a predetermined amount to switch on an alarm lamp of a cluster 30, and the like are mounted on the fuel filter 20.

The heater 24 of the fuel filter 20 improves low temperature startup performance, and lowers viscosity of the fuel by using the heater to smoothly supply the fuel in order to solve a problem in which viscosities of some components (for example, paraffin) of the fuel increase and the fluidity of the fuel decreases, when the temperature of the diesel fuel decreases to be lower than a reference low temperature value, due to the characteristics of the diesel fuel.

Here, a configuration and an operation of a heater circuit mounted on a diesel fuel filter according to the related art will be described below.

FIG. 2 is a circuit diagram of a heater circuit mounted on a diesel fuel filter according to the related art.

In FIG. 2, the heater 24 is mounted within a fuel filter 20, and the heater is a positive temperature coefficient (PTC) heater.

A thermo-switch 22 is mounted within the fuel filter 20 as a bimetal switch type for detecting the temperature of the fuel from the fuel tank.

Then, the heater 24 is connected to the battery through a relay 28 for a heater power source, and the thermo-switch 22 switches on and off the relay 28 for a heater power source in an ignition step IG2.

Accordingly, if the thermo-switch 22 detects the temperature of the fuel supplied from the fuel tank to the fuel filter 20 and it is determined that the temperature of the fuel is in a low temperature range or less, the thermo-switch 22 is switched on and the relay 28 for a heater power source is also switched on at the same time, so that power of a battery is supplied to the heater 24 to heat the fuel according to the operation of the heater 24.

When the temperature of the fuel supplied from the fuel tank to the fuel filter 20 is higher than the low temperature range, the thermo-switch 22 is maintained in an off state and the relay 28 for a heater power source is also maintained in the off state, so that the heater is not operated and the fuel is not heated.

Then, the fuel temperature detection range for switching on and off the thermo-switch 22 is set to be, for example, in a case of a heater/thermo-switch separable type, a temperature of the fuel −3° C.±3 in a case of an on operation and a temperature of the fuel +5° C.±3 in a case of an off operation, and in a case of a heater/thermo-switch integral type, a temperature of the fuel −3° C.±3 in a case of an on operation and a temperature of the fuel +17° C.±3 in the case of an off operation.

However, because a deviation of a fuel temperature detection range measured by the thermo-switch, that is, a difference between a fuel temperature detection range for an on operation of the thermo-switch and a fuel temperature detection range for an off operation of the thermo-switch is larger, the temperature of the fuel cannot be precisely detected, and thus, the on/off control of the heater cannot be precisely performed.

Furthermore, because the fuel temperature detection range detected by the thermo-switch is large, an on/off operation of the thermo-switch is frequently performed, so that the durability of the thermo-switch deteriorates and may easily break down.

In addition, a connector for a thermo-switch including a connector for a heater connected to a relay for a heater power source is consumed, manufacturing costs increase, and the number of processes for mounting the connector in an inline assembly process also increases.

SUMMARY

The present disclosure has been made in an effort to solve the above-mentioned problems, and provides a heater control apparatus and a heater control method of a fuel filter for a vehicle by which after a fuel temperature detection sensor mounted on an engine detects a temperature of a fuel, an engine electronic control unit (ECU) switches on a relay for a heater power source if the temperature of the fuel is lower than a reference temperature, and switches off the relay for a heater power source if the temperature of the fuel is higher than a reference temperature, the operation time of a heater is longer than a predetermined time, or the voltage of a battery is lower than a predetermined voltage, so that a precise on/off control of the heater can be realized.

In accordance with an embodiment in the present disclosure, a heater control apparatus of a fuel filter for a vehicle includes a heater mounted within a fuel filter; a relay for a heater power source for supplying or interrupting power of a battery to or from the heater; a fuel temperature detection sensor mounted on an engine, for detecting a temperature of a fuel; and an engine ECU for switching on and off the relay based on a detection signal of the fuel temperature detection sensor A timer for measuring an operation time of the heater may be connected to the engine ECU.

A voltage measurement unit for measuring a voltage of the battery may be connected to the engine ECU.

A cooling water temperature sensor or an exterior air temperature sensor may be connected to the engine ECU.

In accordance with another embodiment in the present disclosure, a heater control method of a fuel filter for a vehicle includes detecting the temperature of a fuel that passes through a fuel filter from a fuel tank and is supplied to an engine by a fuel temperature detection sensor mounted on the engine; and switching on a relay for a heater power source if a temperature of the fuel is lower than a reference temperature and switching off the relay if the temperature of the fuel is higher than the reference temperature, by an engine ECU that receives a detection signal of the fuel temperature detection sensor.

The heater control method further includes, if the operation time of the heater is longer than a predetermined time, switching off the relay for a heater power source by the engine ECU.

The heater control method further includes, if the voltage of a battery that is a power source of the heater is lower than a predetermined voltage for a predetermined time, switching off the relay for a heater power source by the engine ECU.

The heater control method further includes, if the temperature of the fuel does not rise to a reference temperature or higher for a predetermined time after the operation of the heater, adopting a temperature of engine cooling water or a temperature of the exterior air as a switching on/off determination factor of the relay for a heater power source, by the engine ECU.

The present disclosure provides the following effects through the apparatus and method.

First, because a fuel temperature detection sensor mounted on an engine detects the temperature of a fuel and an engine ECU performs an on/off control of a relay for a heater power source based on the detected temperature of the fuel, a precise on/off control of a heater can be achieved.

Second, manufacturing costs can be reduced and the number of assembly processes can be reduced by deleting an existing thermo-switch.

Third, when the heater reaches a maximum operation time, a fire accident due to an excessive operation of the heater can be prevented by interrupting the relay for a heater power source.

Fourth, when the voltage of the battery is lowered to less than a predetermined voltage for a predetermined time, discharging of a battery due to excessive power consumption of the heater can be prevented by interrupting the relay for a heater power source.

Fifth, when the temperature of the fuel does not rise for a predetermined time after the operation of the heater, a fail-safe function for switching on and off the heater using the temperature of the cooling water and the temperature of the exterior air can be provided.

BRIEF DESCRIPTION OF THE DRAWINGS

The above and other features of the present disclosure will now be described in detail with reference to certain exemplary embodiments thereof illustrated by the accompanying drawings which are given herein below by way of illustration only, and thus are not limitative of the present disclosure, and wherein.

Figure 1:
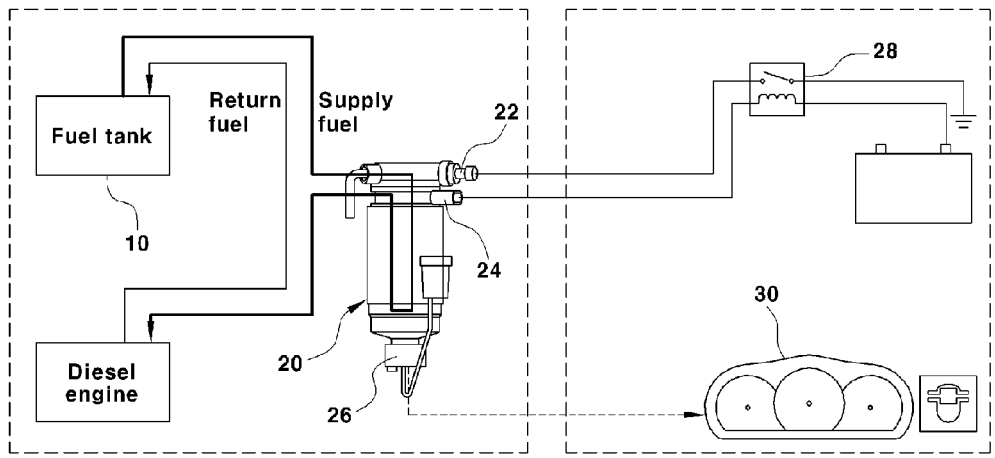
FIG. 1 is a diagram illustrating a diesel fuel supply system according to the related art.
Figure 2:
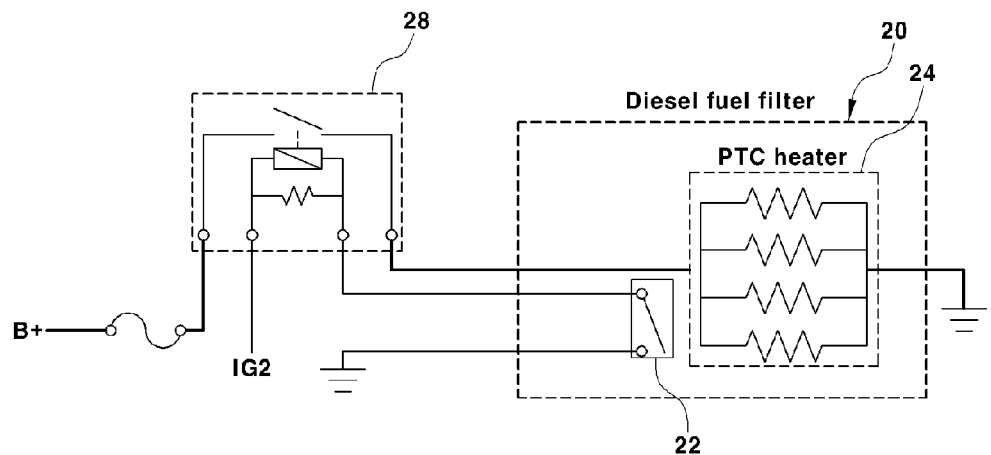
FIG. 2 is a circuit diagram of a heater circuit mounted on a diesel fuel filter according to the related art.

It should be understood that the appended drawings are not necessarily to scale, presenting a somewhat simplified representation of various features of the present invention as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Hereinafter, exemplary embodiments will be described in detail with reference to the accompanying drawings.

The main point of the present invention is to use a fuel temperature detection sensor mounted on an engine instead of an existing thermo-switch to control switching on and off of a relay for a heater power source for switching on and off a heater of a diesel fuel filter.

Figure 3:
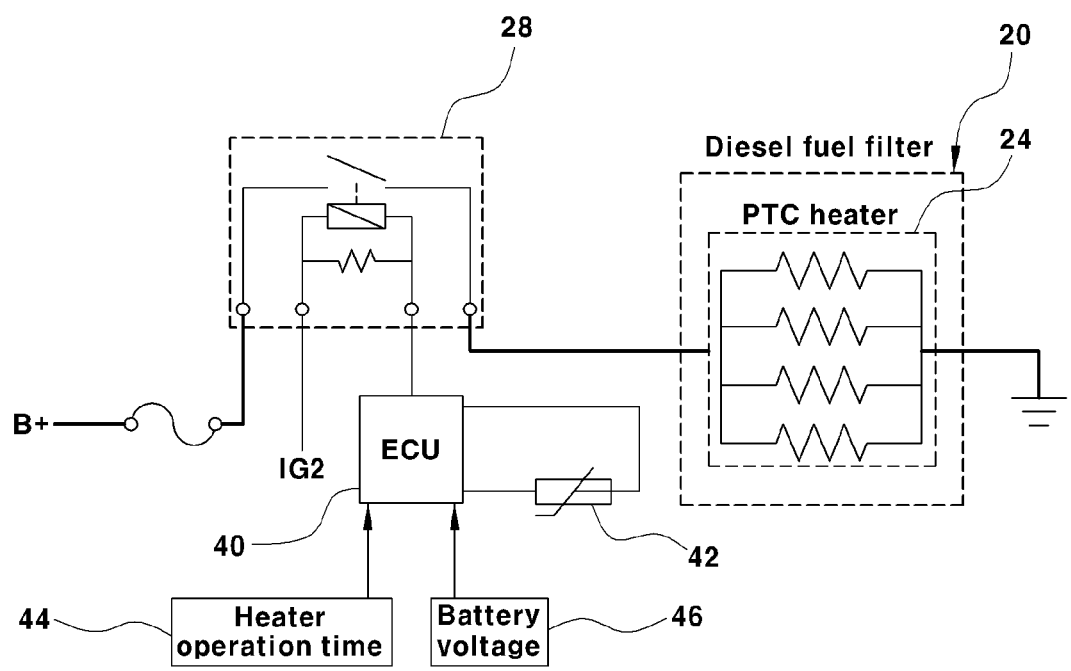
FIG. 3 is a circuit diagram illustrating a heater control apparatus of a fuel filter for a vehicle according to the present disclosure.

FIG. 3 is a circuit diagram illustrating a heater control apparatus of a fuel filter for a vehicle according to the present disclosure.

In FIG. 3, reference numeral 24 denotes a heater mounted within a fuel filter 20, and the heater is a positive temperature coefficient (PTC) heater.

Then, a fuel temperature detection sensor 42 mounted on an engine detects a temperature of fuel to operate the heater 24, instead of an existing thermo-switch.

The fuel temperature detection sensor 42 may be arbitrarily mounted on the engine and at a desired location of a fuel supply line through which a fuel flows.

Accordingly, manufacturing costs and the number of assembly processes can be reduced by excluding an existing thermo-switch 22 mounted within the fuel filter 20 and a connector for a thermo-switch from the fuel filter 20.

Here, an output terminal of the fuel temperature detection sensor 42 is connected to an input terminal of an engine electronic control unit (ECU) 40, and a temperature sensing signal of the fuel temperature detection sensor 42 is transmitted in real time to the engine ECU 40 in an ignition step IG2.

A relay for a heater power source for supplying or interrupting battery power to or from the heater 24 is controlled by the engine ECU 40.

An output terminal of the engine ECU 40 is connected to the relay 28 for a heater power source, and the engine ECU 40 switches on and off the relay 28 for the heater power source in the ignition step IG2.

Accordingly, when a fuel from the fuel tank passes through the fuel filter to be supplied to the engine, the fuel temperature detection sensor 42 detects the temperature of the fuel and transmits a detection signal to the engine ECU 40, and subsequently, if the engine ECU 40 determines that the temperature of the fuel is lower than a reference temperature (for example, about 2° C.), the engine ECU 40 switches on the relay 28 to operate the heater 24 and increase the temperature of the fuel.

If the engine ECU 40 determines that the temperature of the fuel is higher than a reference temperature (for example, about 12° C.) after the fuel temperature detection sensor 42 detects the temperature of the fuel and transmits a detection signal to the engine ECU 40, the engine ECU 40 switches off the relay 28 because the operation of the heater is unnecessary.

In this way, because the fuel temperature detection sensor 42 mounted on the engine detects the temperature of the fuel and the engine ECU 40 switches on and off the relay 28 based on the detected temperature of the fuel, switching on and off of the heater can be precisely controlled by accurately detecting the temperature of the fuel, unlike in an existing thermo-switch having a severe temperature detection deviation.

A timer 44 which measures an operation time of the heater as an switching-off determination element of the relay 28 is further connected to an input terminal of the engine ECU 40, and a voltage measurement unit 46 for measuring the voltage of the battery is further connected to the input terminal of the engine ECU 40.

Accordingly, the heater operation time measured by the timer 44 is input to the engine ECU 40, and if the heater operation time is longer than a predetermined time (about 5 minutes), the engine ECU 40 switches off the relay 28.

In more detail, because a fire may be caused if the heater is operated for an excessive time due to a breakdown of the fuel temperature detection sensor or the like, the engine ECU 40 switches off the relay 28 if the heater operation time is longer than the predetermined time (about 5 minutes) so that a fire accident due to the excessive operation of the heater can be prevented.

Accordingly, a battery voltage signal detected by the voltage measurement unit 46 is input to the engine ECU 40, and if the battery voltage is lower than a predetermined voltage for the predetermined time, the engine ECU 40 switches off the relay 28.

When current consumption due to an operation of the heater 24 is excessive and the battery voltage is lower than a predetermined voltage for the predetermined time, the engine ECU 40 switches off the relay 28 in order to prevent discharging of the battery so that the discharging of the battery due to excessive current consumption of the heater may be prevented.

Figure 4:
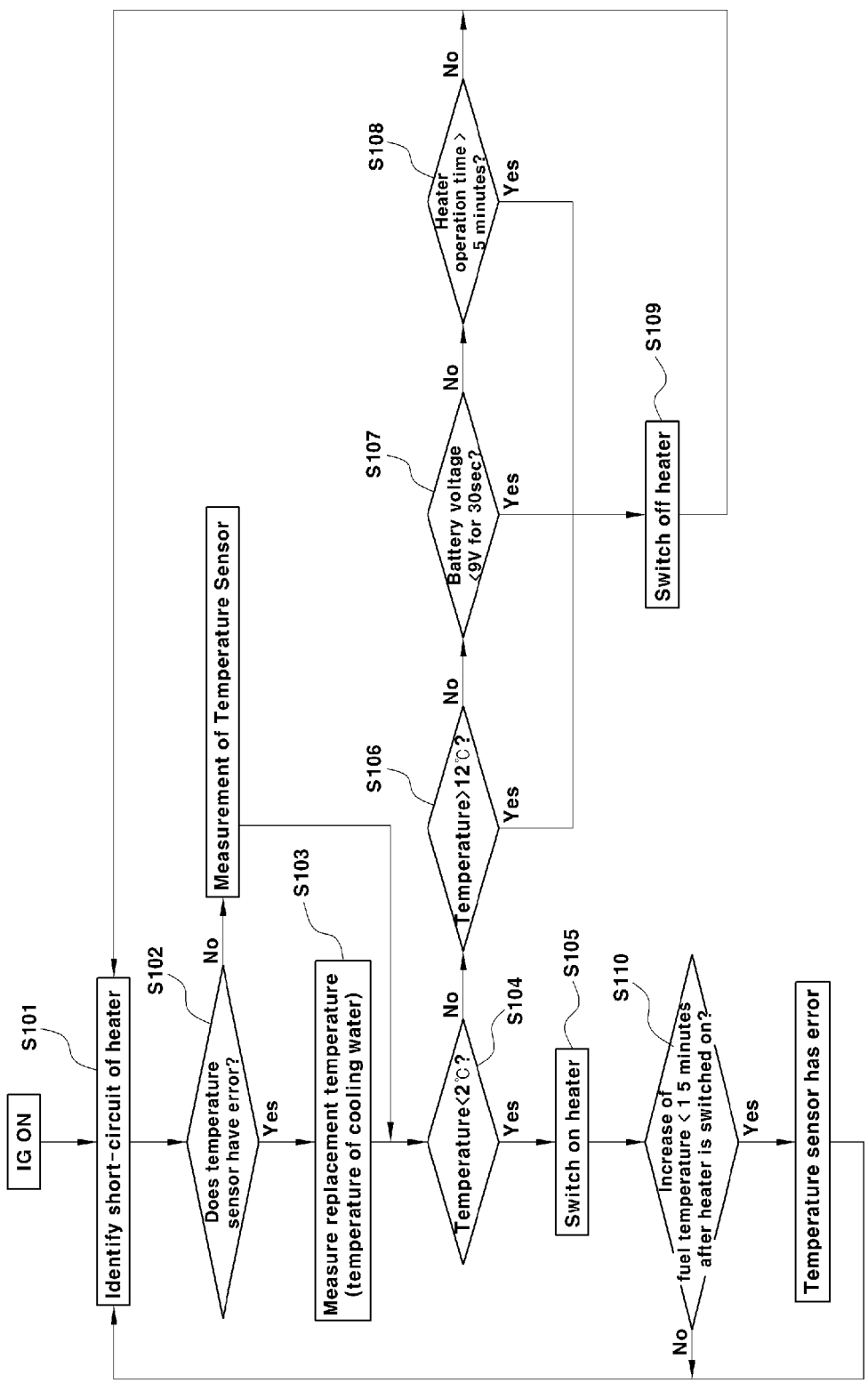
FIG. 4 is a flowchart illustrating an embodiment of a heater control method of a fuel filter for a vehicle according to the present disclosure.

When the temperature of the fuel does not rise for the predetermined time after the operation of the heater 24, that is, when the detection temperature of the fuel temperature detection sensor 42 is not changed for the predetermined time, the engine ECU 40 determines that the power line of the heater is short-circuited and the fuel temperature detection sensor breaks down, and accordingly performs a fail-safe control as illustrated in the flowchart of FIG. 4.

First, it is determined whether a current flows to the power line of the heater (S101), and it is determined whether the fuel temperature detection sensor has an error if the power line of the heater is normal (S102).

If it is determined that the fuel temperature detection sensor breaks down, the engine ECU 40 uses a temperature sensing value of an engine cooling water temperature sensor (not illustrated) or an exterior air temperature sensor (not illustrated) (S103).

For example, it is determined whether the temperature of the engine cooling water is lower than a reference temperature (about 2° C.) (S104), and the engine ECU 40 switches on the relay 28 if the temperature of the engine cooling water is lower than the reference temperature (S105), and it is determined whether the temperature of the engine cooling water is higher than a reference temperature (about 12° C.) (S106), and the engine ECU 40 switches off the relay 28 if the temperature of the engine cooling water is higher than the reference temperature (S109).

Even when the engine ECU 40 switches on and off the relay 28 using the temperature of the engine cooling water, if the battery voltage is lower than a predetermined voltage for a predetermined time (S107) or the operation time of the heater is longer than a predetermined time (S108), the engine ECU 40 switches off the relay 28 (S109).

About 5 minutes after the engine ECU 40 switches on the relay 28 (S105) such that the heater is operated, it is determined again whether the temperature of the fuel rises according to the operation of the heater (S110).

In this way, when the temperature of the fuel does not rise for the predetermined time after the operation of the heater, a fail-safe function for switching on and off the heater using the temperature of the cooling water and the temperature of the exterior air can be provided.

What is claimed is:

1. A heater control apparatus of a fuel filter for a vehicle, comprising:
    a heater mounted within a fuel filter;
    a relay for a heater power source supplying or interrupting power of a battery to or from the heater;
    a fuel temperature detection sensor mounted on an engine and detecting a temperature of a fuel;
    a voltage measurement sensor for measuring a voltage of the battery connected to the engine ECU; and
    an engine electronic control unit (ECU) for switching on and off the relay based on a detection signal of the fuel temperature detection sensor,
    wherein the engine ECU switches off the relay if a heater operation time is longer than a predetermined time,
    wherein a battery voltage signal detected by the voltage measurement sensor is input to the engine ECU, and if a battery voltage indicated by the battery voltage signal is lower than a predetermined voltage for the predetermined time, the engine ECU switches off the relay.

2. The heater control apparatus of claim 1, wherein a timer for measuring an operation time of the heater is further connected to the engine ECU.

3. The heater control apparatus of claim 1, wherein a cooling water temperature sensor or an exterior air temperature sensor is further connected to the engine ECU.

4. A heater control method of a fuel filter for a vehicle, comprising:
    detecting a temperature of a fuel that passes through a fuel filter from a fuel tank and is supplied to an engine by a fuel temperature detection sensor mounted on the engine;
    switching on and off a relay for a heater power source, and switching on the relay if the temperature of the fuel is lower than a reference temperature and switching off the relay if the temperature of the fuel is higher than the reference temperature, by an engine ECU that receives a detection signal of the fuel temperature detection sensor;
    switching off the relay by the engine ECU when an operation time of the heater is longer than a predetermined time; and
    switching off the relay by the engine ECU when a voltage of a battery that is the heater power source is lower than a predetermined voltage for the predetermined time.

5. The heater control method of claim 4, further comprising:
    adopting a temperature of engine cooling water or a temperature of the exterior air as a switching on/off determination factor of the relay for a heater power source, by the engine ECU when the temperature of the fuel does not rise to a reference temperature or higher for a predetermined time after the operation of the heater.

* * * * *